(12) United States Patent
Walker (10) Patent No.: US 7,179,418 B2
(45) Date of Patent: Feb. 20, 2007

(54) DEVICE AND METHOD FOR MINIMIZING PATHOGENS IN HEATED WATER

(75) Inventor: Brian Keith Walker, Broken Arrow, OK (US)

(73) Assignee: Quikwater, Inc., Sand Springs, OK (US)

( * ) Notice: Subject to any disclaimer, the term of this patent is extended or adjusted under 35 U.S.C. 154(b) by 446 days.

(21) Appl. No.: 10/049,896

(22) PCT Filed: Jun. 13, 2001

(86) PCT No.: PCT/US01/40956

§ 371 (c)(1),
(2), (4) Date: Feb. 12, 2002

(87) PCT Pub. No.: WO01/95949

PCT Pub. Date: Dec. 20, 2001

(65) Prior Publication Data

US 2003/0034298 A1 Feb. 20, 2003

(51) Int. Cl.
*A61L 2/24* (2006.01)
(52) U.S. Cl. ............... 422/3; 422/1; 422/109; 422/110; 422/307; 422/308
(58) Field of Classification Search ............... 422/109, 422/110, 308, 1, 307, 3; 210/651, 181, 175, 210/179
See application file for complete search history.

(56) References Cited

U.S. PATENT DOCUMENTS

| | | | | |
|---|---|---|---|---|
| 4,530,347 A | * | 7/1985 | Baker et al. | 126/355.1 |
| 4,750,472 A | * | 6/1988 | Fazekas | 122/13.3 |
| 4,850,268 A | * | 7/1989 | Saito et al. | 454/341 |
| 5,022,898 A | * | 6/1991 | Schmoegner et al. | 96/136 |
| 5,086,731 A | * | 2/1992 | Lockett et al. | 126/351.1 |
| 5,139,676 A | * | 8/1992 | Ebisawa et al. | 210/651 |
| 5,168,861 A | * | 12/1992 | Lutzen et al. | 126/355.1 |
| 5,293,861 A | * | 3/1994 | Mandeville et al. | 126/355.1 |
| 5,498,396 A | * | 3/1996 | Aikus et al. | 422/109 |
| 5,888,453 A | * | 3/1999 | Luker | 422/38 |
| 5,967,137 A | * | 10/1999 | Guillet et al. | 126/360.1 |
| 6,212,333 B1 | * | 4/2001 | Olk et al. | 392/485 |
| 6,490,866 B1 | * | 12/2002 | Cummings | 60/775 |
| 6,783,713 B2 | * | 8/2004 | Tremblay et al. | 264/113 |

* cited by examiner

Primary Examiner—Krisanne Jastrzab
(74) Attorney, Agent, or Firm—Cherskov & Flaynik (57) ABSTRACT

A device (100) for heat-treating water is provided, comprising a confined heating zone, a passage way (15) for transporting the water to said confined heating zone (23) so as to facilitate heating of the water, a controller (27) for preventing the heated water from leaving the device (100) until pathogens entrained in the heated water are killed; and an antimicrobial substrate (20) for preventing pathogens entrained in unheated water from leaving the device (100).

18 Claims, 6 Drawing Sheets

DEVICE AND METHOD FOR MINIMIZING PATHOGENS IN HEATED WATER

BACKGROUND OF THE INVENTION

1. Field of the Invention

This invention relates to heat treating water, and more specifically this invention relates to a device and method for heat-treating water via direct contact heating.

2. Background of the Invention

Water reclamation is rapidly becoming a priority for users of high amounts of water. Such users include industrial chemical users, and food processors, the later of which often require liberal rinses of water to wash fruits, vegetables and animal carcasses. Other high water uses include sewage disposal.

Systems exist to extract volatile chemicals from water. U.S. Pat. No. 5,176,798 to Rodden on Jan. 5, 1993 discloses a system for removing and reclaiming volatile organic contaminants from water. U.S. Pat. No. 6,103,191 discloses a system for pasteurizing and dewatering sludge.

Other significant pollutants are pathogens. Pathogens are of particular concern in food processing operations, as outlined supra. As such, before water can be discharged, some jurisdictions require that pathogen levels be decreased. Furthermore, instead of direct discharge into the environment, reuse of water may be in order, particularly in areas prone to water shortages.

In light of the foregoing, methods and technologies that reduce water consumption or allow for water recycling and reclamation are becoming more appealing to many food processors. For example, a process exists (U.S. Pat. No. 3,962,076) for converting aqueous sewage to potable water. However, that process relies on "coking" sewage to form gases, coke and effluent.

Another water treatment method (disclosed in U.S. Pat. No. 3,986,955) relies on subjecting waste water to an electric current to produce water vapor.

Other water treatment methods utilize heat. For example, U.S. Pat. No. 5,487,814 utilizes multiple columns for distilling and sterilizing feed water.

A need exists in the art for a water reclamation treatment method which employs a single step, and high efficiency heat exchange. The method should be applicable to existing water heating systems, and facilitate the minimization of both liquid and vapor phase pathogen-laden effluents.

SUMMARY OF THE INVENTION

It is an object of the present invention to provide a pathogen-reduction device and process that overcomes the disadvantages of the prior art.

Another object of the present invention is to provide a device for treating water contaminated with food-borne pathogens. A feature of the device is incorporating particulate, liquid, and vapor entrainment means. An advantage of the device is that it offers a complete treatment mechanism for water reclamation.

Yet another object of the present invention is to provide a modification to existing direct contact gas-fired water heaters to facilitate pathogen destruction. A feature of the invention is a temperature-driven and residence time-driven process that assures that no water leaves the invented system prior to complete treatment. An advantage of the invention is that no water is made available to end users until pathogen destruction is achieved.

A further object of the present invention is to provide a device for minimizing exposure of vapor-, liquid- and particulate-entrained pathogens. A feature of the device is the utilization of a heated water curtain and an antimicrobial substrate during the processing of water containing pathogens. An advantage of the device is the treatment of pathogen-contaminated water and reutilization of treated water, all in close quarters.

In brief, the invention provides a device for heat-treating water, the device comprising a confined heating zone; a means for transporting the water to said confined heating zone so as to facilitate heating of the water; a means for preventing the heated water from leaving the device until pathogens entrained in the heated water are killed; and a means for preventing pathogens entrained in unheated water from leaving the device.

Also provided is a method for reclaiming fluid contaminated with pathogens, the method comprising providing a heated, controlled atmosphere; subjecting the fluid to the controlled atmosphere for a time and at a temperature sufficient to kill pathogens entrained in a liquid phase of the fluid; subjecting an aerosolized phase of the fluid to an antimicrobial substrate; releasing the liquid phase and the aerosolized phase to the ambient environment.

BRIEF DESCRIPTION OF THE DRAWING

The present invention together with its objects and advantages may best be understood from the following detailed description of the embodiment of the invention illustrated in the drawing, wherein.

DETAILED DESCRIPTION OF THE INVENTION

Generally, the invention provides a device and a process for treating pathogen-laden water. The treated water would then be in such condition so as to be directly discharged into the environment or else reused in subsequent processing operations which require water. Portions of the invention are contained in U.S. Provisional Patent Application No. 60/212062, filed on Jun. 13, 2000, incorporated herein by reference and elaborated upon infra.

A salient feature of the device is that the rendering of no water from the system indicates to a user the unsuitability of the water dwelling in the device. The invented system will only deliver "safe" water. This contrasts with conventional devices which provide water on demand.

The invention is based on a direct contact water heating system. Such a system exposes water directly to hot combustion gases to efficiently heat the water. Such combustion gas temperatures can reach 2200° F. Typically, the water cascading towards to intermingle with combustion gas temperatures remain below its condensation temperature. Some of the water may vaporize, or aerosolize. Provisions are made herein to assure that such vaporized or aerosolized fractions also are treated to remove pathogens entrained therein.

Exemplary direct contact water heating devices are available through Webco Industries, Inc., of Sand Springs, Okla. One such device is described in U.S. Pat. No. 6,089,223, owned by the instant Assignee, and incorporated herein by reference.

The following device description deals with a gas-fired direct contact water heater for illustrative purposes only. As such, the specification and scope of the claims should not be relegated to dry firing chambers or other types of direct contact systems. Rather any device which imparts heat to water in a controlled environment is suitable.

Figure 1:
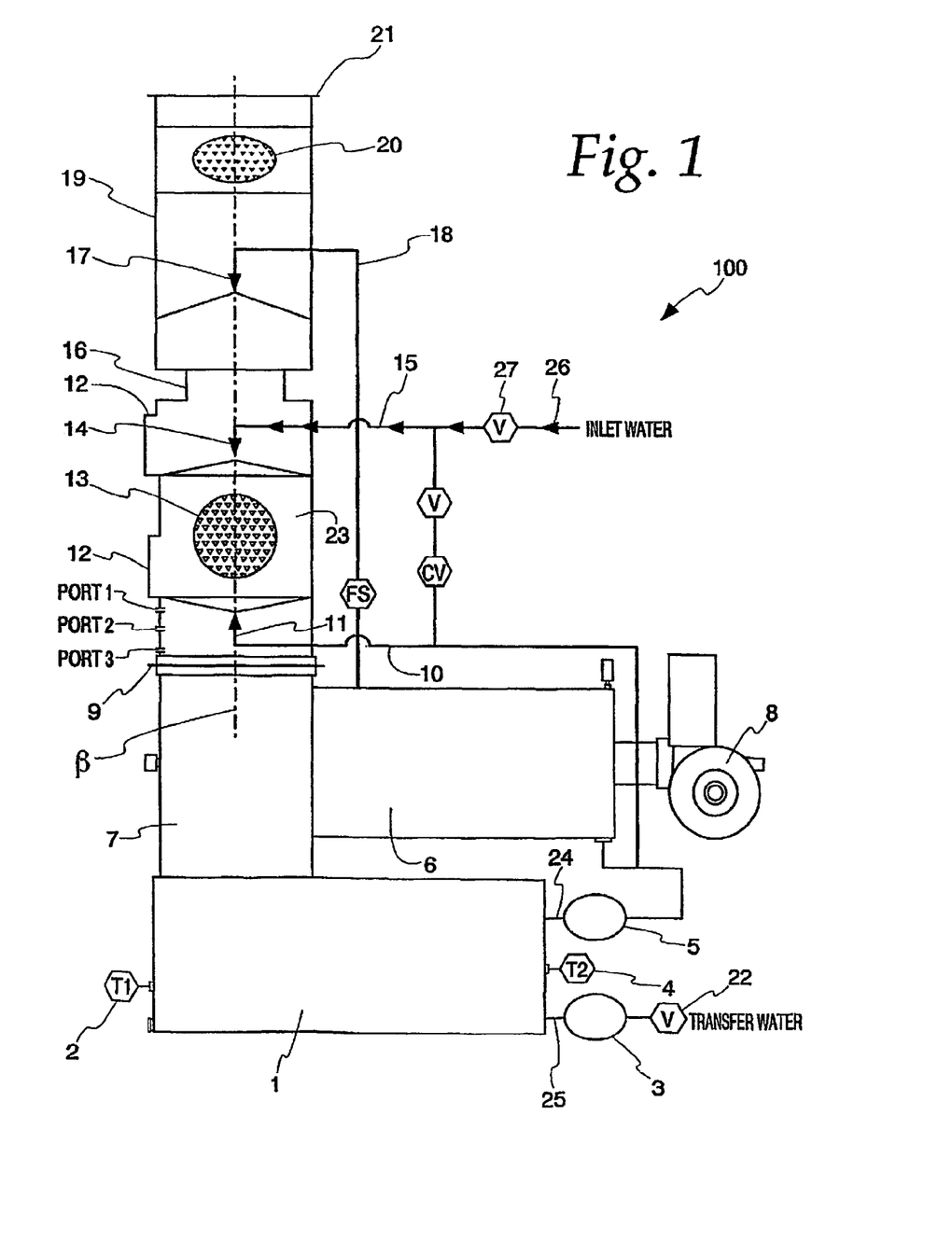
FIG. 1 is an elevational view of an exemplary embodiment of the invention, in accordance with features of the present invention.

A schematic diagram of the invented device is depicted in FIG. 1 as numeral 100. As depicted in FIG. 1, the device consists primarily of a dry firing chamber 6 juxtaposed to a upwardly extending heat exchange column 23. The firing chamber is perpendicularly arranged to the upwardly extending heat exchange column. Typically, the chamber is integrally molded to the column.

The joining of the firing chamber 6 to the heat exchange column defines an exhaust gas entry chamber 7 having a longitudinal axis co-extending with the longitudinal axis β of the heat exchange column 23.

Water from one or a plurality of nozzles 14, 17, or other means of ingress is directed downwardly toward the exhaust gas entry chamber 7. For more complete heat exchange, heat transfer media 13 is utilized. Such transfer media is any non-absorbing material (relative to the fluid being cooled). Stainless steel packing rings are an exemplary transfer media in the case of water heating. The transfer media 13 is placed intermediate the downwardly directed nozzles 14, 17 and the exhaust gas entry chamber. Such heat transfer media assures extremely efficient temperature exchange, between exhaust gas and downwardly cascading water, of up to 99 percent.

Water so heated after passing through the transfer media 13 and the exhaust gas entry chamber is collected in a water storage holding tank 1. The storage tank is either removably attached to a depending portion of the exhaust gas entry chamber 7 via a mating flange 9 or else integrally molded thereto.

One or a plurality of means of egress 24, 25 is provided to evacuate or substantially drain the storage tank.

To this direct contact water heater configuration is added various means for assuring destruction of pathogens harbored in an inlet water feed 26. Generally, bacteria laden water 26 is injected into the device 100 via a water feed 15. Water cascades into the storage holding tank 1 and is held there until the following conditions are met:
1. Enough water is in the storage tank 1 to allow re-circulation pump 5 to actuate. Determination as to water volume is made via standard means, such as a water float situated in the tank.
2. The gas-fired burner 8, is actuated to a firing mode.
3. The temperature of the water in the tank 1 is raised to the required thermal temperature to kill all pathogens in the water tank and held at that temperature for a time suitable to assure complete destruction. For most pathogens of interest, approximately 120 seconds is appropriate.

After all of the above conditions are met, an outlet water pump 3 is actuated to facilitate delivery of water to the final user.

An inlet water valve 27 is programmed (via a standard programmable logic controller) to direct water to the water storage tank 1 only when the burner 8 is on. However, this is not the case when the tank water level falls below a predetermined level, so indicated by a water level switch (not shown). In the instance where the tank water level falls below the predetermined "tank Empty" level, then all conditions 1–3 above must be met again before output water flow can resume.

A caveat to the above scenario exists when the device 100 is a modulating unit (i.e., wherein the device provides various degrees of firing status so as to optimize $NO_x$ removal). In modulating scenarios, it is appropriate for the burner to be at its high fire position (or a minimum firing position) before the inlet water valve 27 is opened.

Once the burner has achieved a high fire position, the inlet water valve 27 opens and stays open until the water storage tank 1 has been filled. An outlet water pump 3 will facilitate transport of water out of the storage tank 1 for as long as a tank temperature sensor 4 indicates that the tank water temperature is at or above the needed temperature for pathogen eradication to occur. If the tank water temperature falls below the prescribed temperature, then both the output water pump 3 and a containment valve 22, located distal or downstream from the output water pump, are used to shut down all outgoing water flow to the user destination.

Optionally, a myriad of temperature sensors are also provided, with a modulation temperature sensor 2 juxtaposed near the heated-water entry point into the storage tank 1, and a burner make up heat and output pump permission sensor 4 situated at the end of the tank distal from the heated water entry point.

Effluent Control

One of the characteristics of a direct contact water heater is that there is a portion of raw unheated water that exits out of an otherwise conventional direct contact water heater. This exhaust is due to the motion of the exhaust gas stream directed upwardly through the heat exchange column 23. An air vapor/exhaust gas containment system is disclosed herein to assure that minimal pathogen exhausting occurs.

The invented containment system shell provides three features to minimize any tendency for pathogens contained in inlet water to be entrained in exhaust effluents. A first feature is the utilization of an antibacterial media bed, 20. The media bed is situated coaxial with the longitudinal axis β of the heat exchange column 23. Suitable antibacterial media 20 is any material having inherent toxicity, absorbing, or adsorbing-capabilities vis-a-vis targeted water pathogens. Also, the material should be tolerant to any temperatures up to 190° F. Several commercially available point-of-use water filters have these characteristics. For example, "Kinetic Degradation Fluxion" material, so named and marketed by KDF Fluid Treatment, Inc, of Three Rivers, Mich., is an exemplary antimicrobial material for incorporation into the media bed 20. This material is comprised of a multitude of copper and zinc bimetallic granules which form hydroxides, when subjected to water. The hydroxides disrupt the electron transport of target organisms, therefore facilitating destruction of those organisms. Other suitable antimicrobial material includes activated carbon, spun glass, and generally high surface area substrates impregnated with antibiotics, synthetic agents, and similar chemotherapeutic agents.

A second feature of the pathogen vapor containment system is a containment spray curtain, so affected by a downwardly depending nozzle 17. The spray curtain nozzle 17 is situated distal from (i.e. upwind from) the main water feed nozzle 14. The spray curtain nozzle also is situated intermediate the antimicrobial bed 20 and the main water feed nozzle 14. Generally, the containment spray curtain derives its water from preheated and pre-sterilized water emanating from the water tank 1 via an internal recirculation loop 18. The recirculation loop 18 is provided with pressurized water via the actuation of a recirculation pump 5 situated intermediate the water tank 1 and the containment nozzle 17.

The inventor has found that water emanating from the containment nozzle serves as a physical barrier that prevents pathogen laden water and particulates contained therein, from leaving the system 100.

A third feature of the containment system is the incorporation of a pressure drop configuration at a point downwind from the containment curtain nozzle 17. This configuration is defined by a containment system shell 19 having a larger diameter than an exhaust gas docking port 16 seen in a typical direct fire system. The location of the larger-diameter shell creates a large velocity/pressure drop in the exhaust stream thereby reducing the ability of the exhaust stream to carry particulate and water droplets out of the confines of the device 100. Generally, an initial positive pressure gradient of at least approximately 2.5 inches of water in the direction away from the combustion chamber and toward the heat exchange column is suitable.

Venting of the treated vapor is facilitated through an exhaust gas connection flange 21.

Process

Detail

FIGS. 1–5 provide schematic representations for the status of the device 100 at various water feed instances. Water flow is indicated by bold arrows.

FIG. 1 depicts water flow at dry start up, that is, when the tank is dry. At this scenario, the combustion chamber as at full fire. Water enters the system via the inlet water conduit 15. Water is allowed to gather in the storage tank 1.

Figure 2:
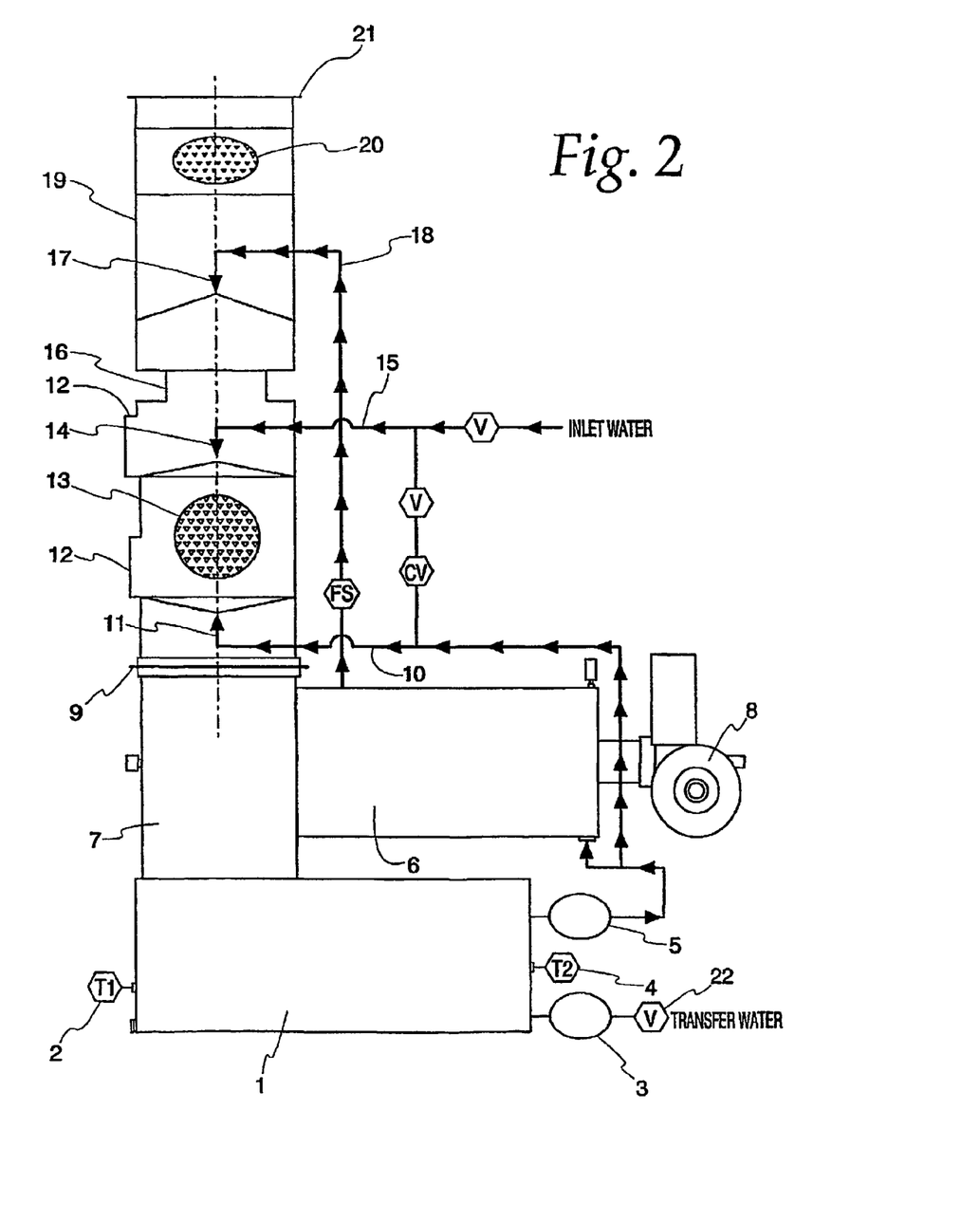
FIGS. 2–5 are schematic diagrams of the invented device at various stages of water flow, in accordance with features of the present invention.

FIG. 2 depicts additional water flow to an upwardly directed spray nozzle 11, which facilitates cooling of the heat exchange material 13. Water feed for this upwardly directed nozzle is from the water-storage tank 1, which is now beginning to take on water. It is at this point where the water curtain nozzle 17 is actuated. It should be noted that water is still not emanating from the device 100 for end-use. Only when the water reaches a predetermined temperature will the output valve 22 and output pump 3 be actuated.

Figure 3:
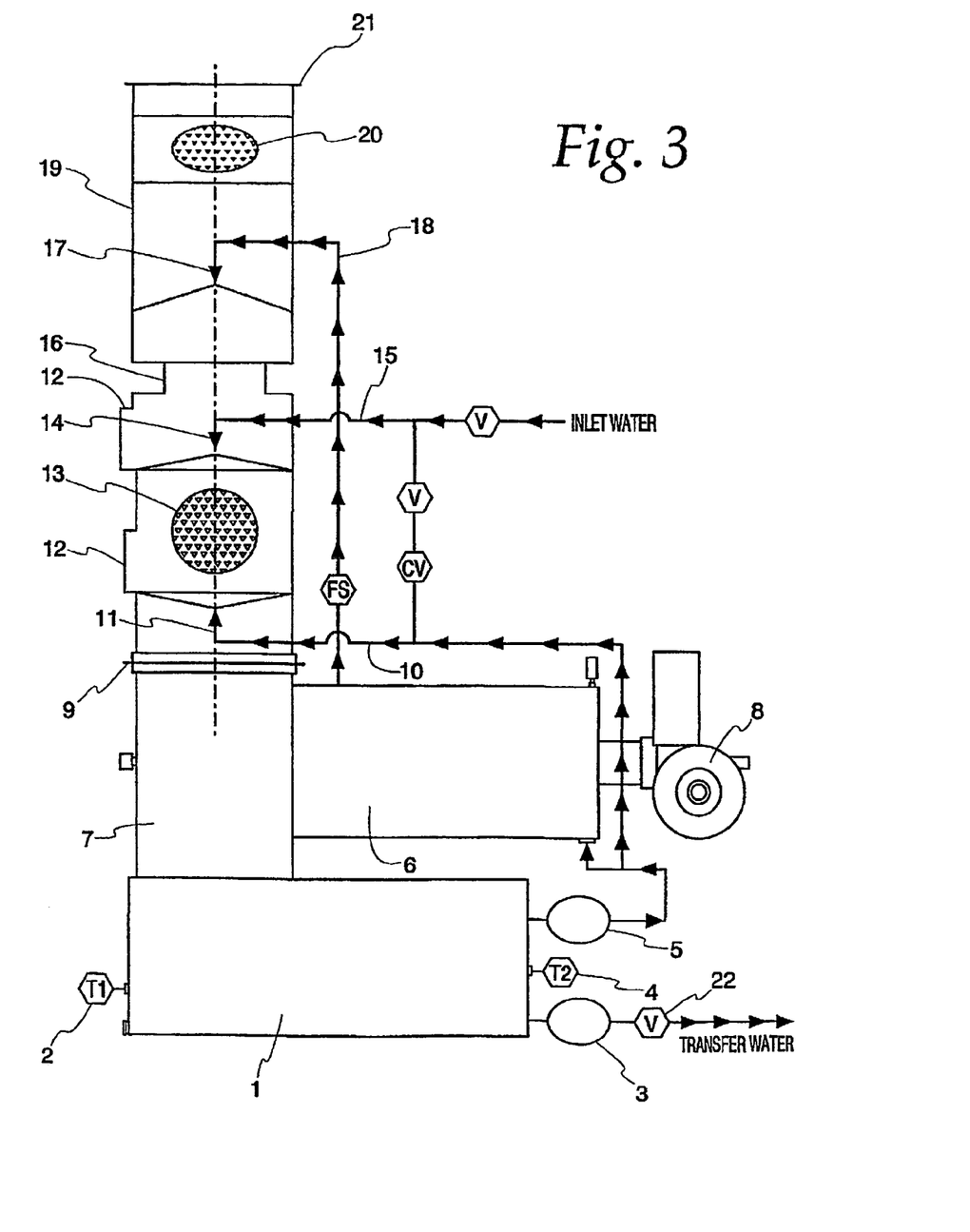

FIG. 3 depicts the first instance wherein water leaves the device for end use. In this mode, the device continues to take in new water via the inlet water line 15, and continues to recirculate water from the storage tank 1 to feed both the water curtain nozzle 17 and the upwardly directed cooling nozzle 11. The storage tank is not full and continues to store incoming water.

Figure 4:
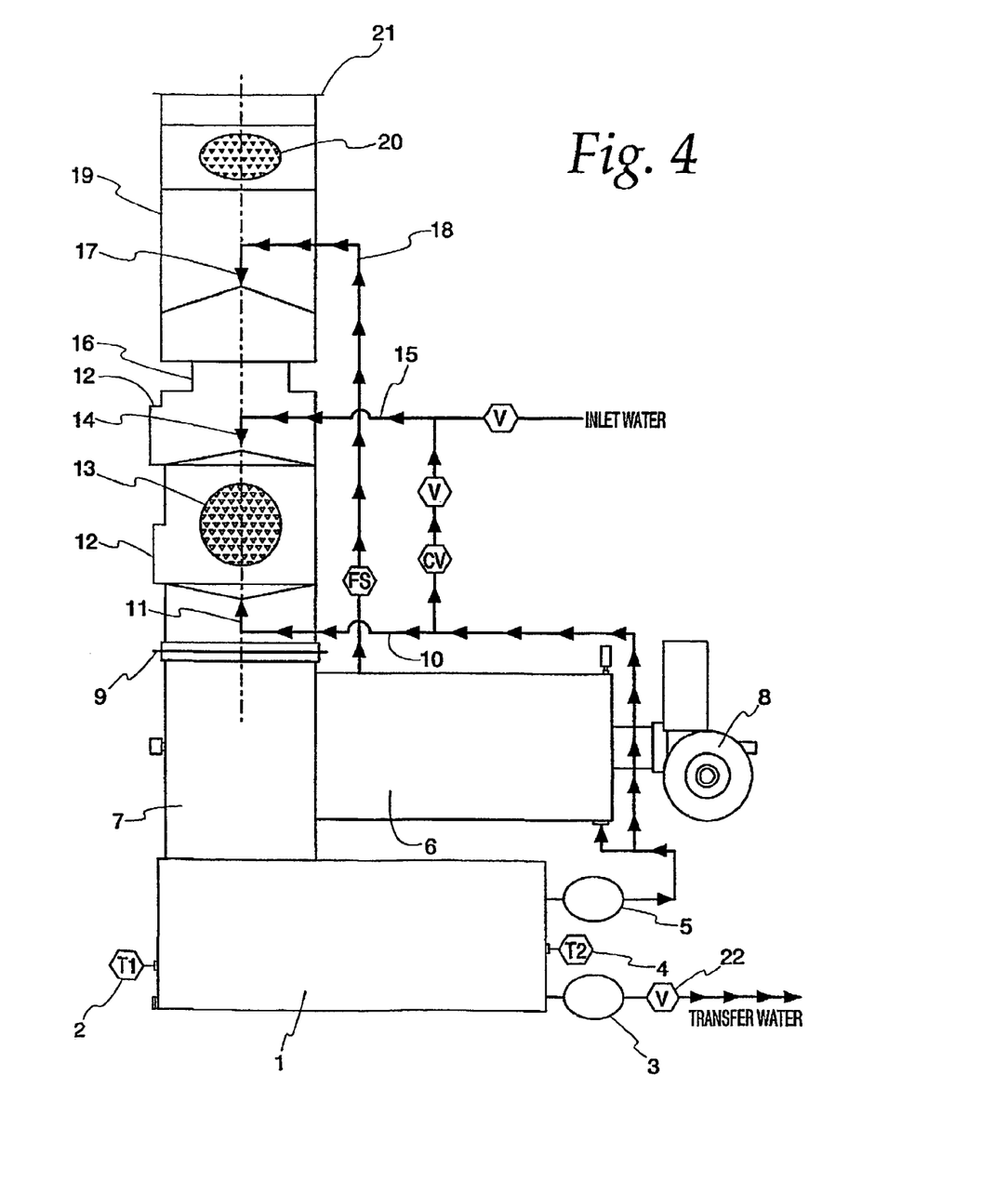

FIG. 4 depicts the situation wherein the desired kill temperature has been reached. All water means of ingress and egress are utilized.

Figure 5:
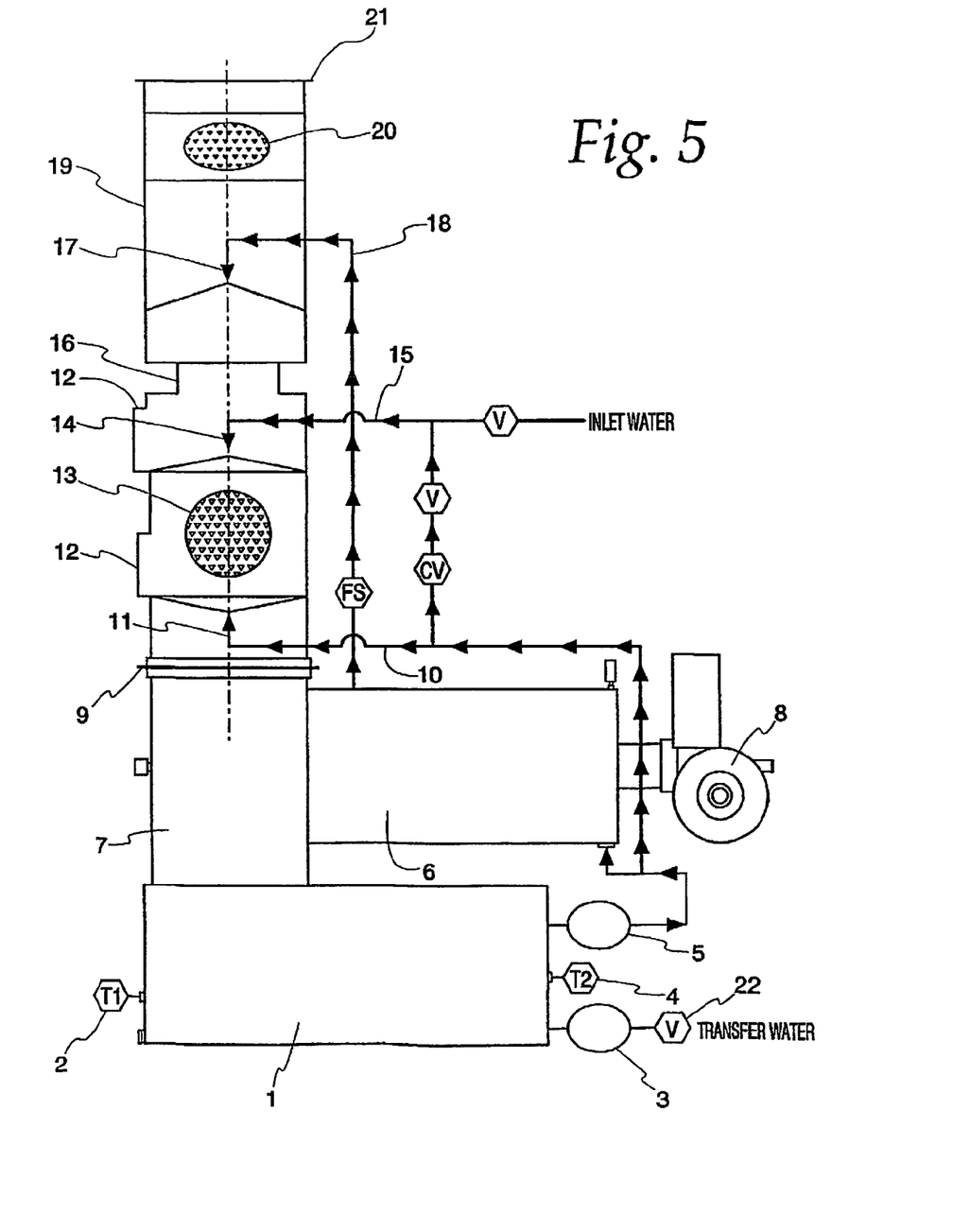

FIG. 5 depicts the situation where the desired kill temperature has not been reached and the tank is full. Despite this state, no water is leaving the device.

Flow rates and dwell times of treated water can be derived empirically to achieve optimum kill of entrained pathogens. Generally, pressure values are dictated by end-user constraints. As such, pressures from approximately 5 psi to 100 psi are suitable in as much as this pressure is accommodated by standard nozzles. Also, the inventor has determined that an outer skin temperature of 170–180 F. of the heat exchange column 23 is indicative of a thorough kill temperature for virtually all pathogens of interest. That and an exhaust temperature of approximately 10 degrees higher than the input water temperature.

The inventor has derived an algorithm that facilitates a user's choice of operating parameters. This algorithm defines the Maximum Allowable Inlet fluid flow (in gallons per minute as follows:

$$\text{BTU/hr of the heater}/(Y \times \Delta T) \qquad \text{Eq. 1}$$

wherein $$\Delta T = (\text{Required Kill Temperature} - \text{Coldest possible inlet fluid temperature})$$

and where Y is derived from the following formula:

$$(\text{Specific heat of the fluid to be heated} \times \text{Weight of the fluid to be heated} \times \text{minutes in one hour}) \qquad \text{Eq.2}$$

Inasmuch as the specific heat for water is 1, and the weight of water at the incoming water temperature is 8.33 pounds per gallon), Y is 500.4. So, in the case of the destruction of pathogens entrained in water, the Maximum Allowable Inlet Water flow in gallons per minute is calculated from the following equation:

$$\text{BTU/hr of the heater}/(500.4 \times \Delta T) \qquad \text{Eq. 3}$$

The 500.4 figure would actually change for water weights above 60° F. However, the weight of water utilized in the algorithm is the heaviest and therefore safest for pathogen kill flow rates. Specifically, water weight is constant between 32° F. and 60° F. but decreases in weight above 60° F. This weight decrease value in turn decreases the numerical value of the denominator of the above algorithm, therefore translating into an increased water volume compared to the heavier water. As such, the inventor presents equation 3 as the safest way to calculate the maximum rate given the maximum weight of water.

In light of the foregoing, the algorithm presented in Equation 1 allows for the flow rate calculation of contaminated fluids other than water, given the specific heat of the fluid and weight per gallon of the fluid.

EXAMPLE

A direct fired gas water heater was modified for in-lab evaluation of microbial reduction and temperature consistency at various flow rates. For the sake of safety, few food-borne pathogens were tested. Rather, indicator organisms of similar lethality (e.g. *Lactobacillus curvatus, Lactococcus lactis, Listeria ivanovil, Listeria welshimeri, Escherichia coli, Enterococcus faecalis,*) were utilized. The evaluation proved significant reduction efficacy in a single-pass through the heating zone. Various sampling ports were situated linearly along longitudinal axis β of the heat exchanger column. 4–7 log cycle reductions of various microorganisms were obtained.

Approximately 40 psig of pressure was utilized. A data logger (Model 2635 A Hydra, from Fluke Corporation, Everett, Wash., recorded the data measured by the sensors at the various ports. Water inlet, outlet and stack exhaust temperatures were measured using standard resistance temperature detectors.

A paddle style flow meter (Model 8512, Signet Scientific Co. El Monte, Calif.) measured inlet water flow rate. Water temperature at the sample ports was measured using a mercury bulb thermometer and manually recorded.

The operation of the modified unit provided approximately 4 to 8 minutes of processing time to obtain samples, depending on flow rate. Samples were pulled from Port 1, Port 2, and Port 3, as depicted in FIG. 1. The provision of Ports 1–3 was solely to facilitate sampling and as such, are not an integral feature of the invented device. In the experimental unit, Port 1 was situated closer to the heat exchange media 13 than was Port 2. Port 2 was situated closer to the heat exchange media 13 than Port 3. Port 2 was therefore situated intermediate Ports 1 and 3.

At 8 gallons per minute, a few microbes were recovered at Port 2. More complete kill was realized at 6 gallons per minute, even at sampling locations above the heat-exchange material 13.

Figure 6:
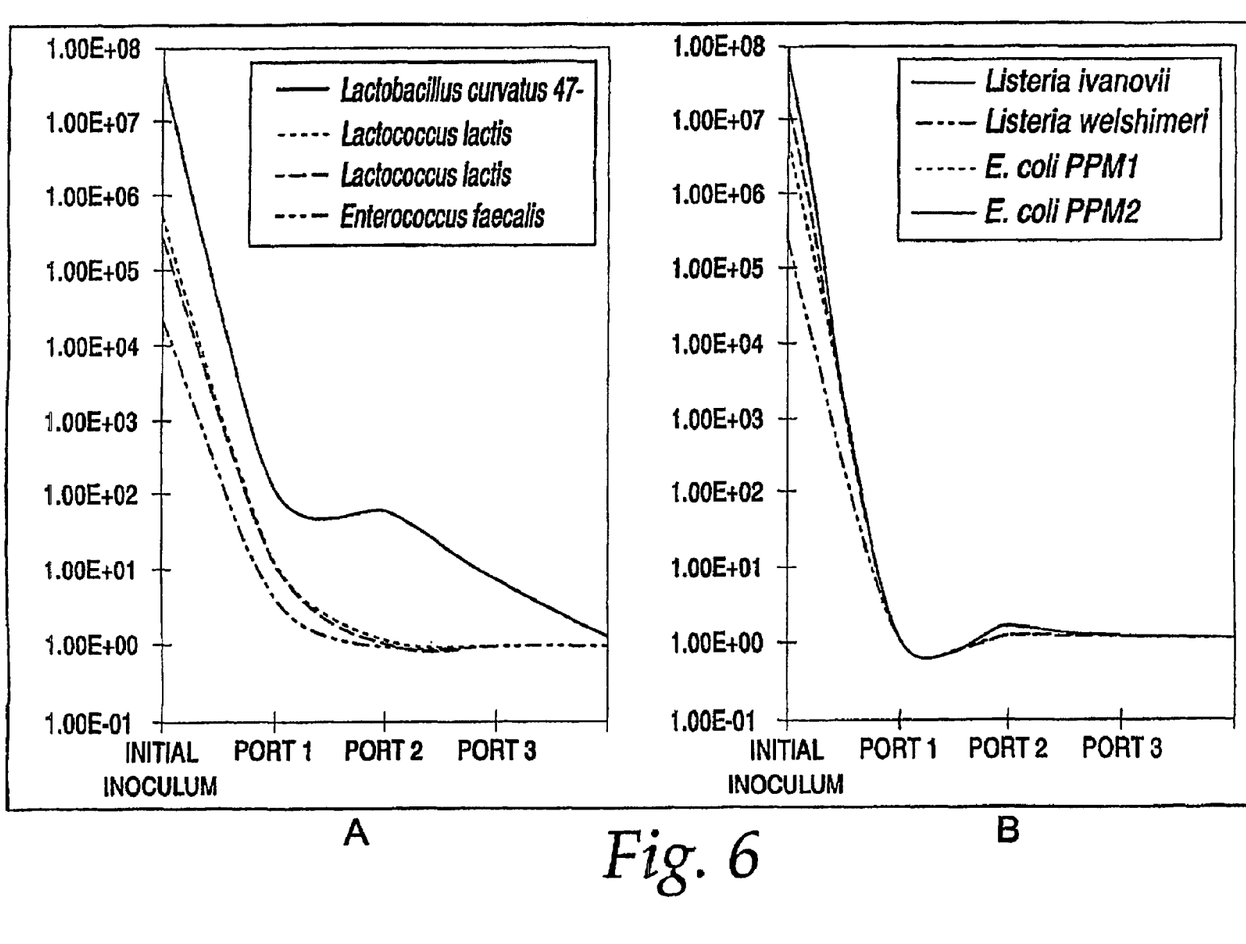
FIG. 6 is a graphic depiction of microbial reduction of individual cultures for various water flow rates, in accordance with features of the present invention.

Kill rates for various pathogens are depicted in FIGS. 6A and 6B. FIG. 6A depicts microbial reduction at 8 gallon per minute feed rates. FIG. 6B depicts microbial reduction at 6 gallon per minute feed rates.

Temperature profiles showed that incoming water is heated from ambient temperature to 180° F. within 400 seconds at 6 gallons per minute, 500 seconds at 8 gallons per minute, and within 800 seconds at 10 gallons per minute. It should be noted that these time values encompass the time from when the device is in no fire mode (i.e., cold), and when no water is in the unit. As such, yield times will be less for units already "on line" and in operating mode.

It was found that the high temperature flash pasteurization offered by the invented device killed all bacteria in the processing streams (~$10^4$–$10^7$ CFU/ml) at flow rates of 6 gpm.

While the invention has been described with reference to details of the illustrated embodiments, these details are not intended to limit the scope of the invention as defined in the appended claims. For example, while heat treatment of water is most discussed in the instant specification, the invented device and method also is suitable for treatment of fluids generally. As noted supra, a salient provision of fluid processing, particularly when using direct contact heaters (i.e. gravity fed heaters) is maintaining the temperature of the fluid at just below its condensation point.

Also, aside from flow rates of incoming fluids being a determinative factor, dwell times of heated fluid also can be adjusted to achieve optimal decontamination results.

The invention claimed is:

1. A pathogen reduction device for water comprising:
   a) a direct contact water heater for heating pathogen laden water;
   b) means for controlling pathogen laden water flow into said direct contact water heater, said pathogen laden water flow having a maximum flow rate defined by the following algorithm:

BTU/hr of the heater/(Y×delta T)

wherein delta T=(Required kill temperature−Coldest possible inlet fluid temperature) and where Y is derived from the following formula:

(Specific heat of the fluid to be heated×Weight of the fluid to be heated×minutes in one hour);

c) means for containing water heated by said direct contact water heater;
   d) means for controlling the removal of heated water from said water containing means; and
   e) means for reducing pathogens in an exhaust gas discharged from said direct contact water heater to atmosphere.

2. The device as recited in claim 1 wherein said water containing means includes a storage tank.

3. The device as recited in claim 1 wherein said heated water removal controlling means includes a plurality of valves actuated by programmable logic controllers.

4. The device as recited in claim 1 wherein said direct contact water heater includes exhaust gas from a gas-fired combustion.

5. The device as recited in claim 4 wherein said direct contact water heater includes a zone for reducing exhaust gas pressure.

6. The device as recited in claim 1 wherein said direct contact water heater includes an antimicrobial substrate.

7. The device as recited in claim 1 wherein said direct contact water heater includes means for heating pathogen laden water to a temperature below its boiling point.

8. A method for reclaiming fluid contaminated with pathogens, the method comprising:
   a) providing a direct contact fluid heater for heating a pathogen laden fluid, said pathogen laden fluid having a maximum flow rate into said direct contact fluid heater defined by the following algorithm:

BTU/hr of the heater/(Y×delta T)

wherein delta T=(Required Kill Temperature−Coldest possible inlet fluid temperature)

and where Y is derived from the following formula:

(Specific heat of the fluid to be heated×Weight of the fluid to be heated×minutes in one hour);

b) subjecting the pathogen laden fluid to heat for a time sufficient to kill pathogens entrained in a liquid phase of the pathogen laden fluid;
   c) subjecting an aerosolized phase of the pathogen laden fluid to an antimicrobial substrate; and
   d) releasing the subjected liquid phase and the subjected aerosolized phase to the ambient environment.

9. The method as recited in claim 8 wherein the direct contact fluid heater has a positive pressure flow leading to the ambient environment.

10. The method as recited in claim 8 wherein the fluid is water.

11. The method as recited in claim 8 wherein the temperature is below the condensation point of the fluid.

12. The device as recited in claim 1 wherein said atmosphere exhaust pathogens reducing means for reducing pathogens in an exhaust gas includes a spray curtain disposed above a main water feed nozzle.

13. The method as recited in claim 8 wherein the step of providing a direct contact water heater includes the step of providing exhaust gas for engaging the pathogen laden fluid.

14. The method as recited in claim 8 wherein the step of subjecting an aerosolized phase includes the step of decreasing the pressure of said aerosolized phase.

15. The method as recited in claim 8 wherein the step of subjecting an aerosolized phase includes the step of providing a containment spray curtain.

16. A method for removing pathogens from water, said method comprising the steps of:
   a) engaging falling pathogen laden water with rising heated exhaust gas in an enclosure with an atmosphere exhaust aperture;

b) controlling the pathogen laden water flow into said enclosure, said pathogen laden water flow having a maximum flow rate defined by the following algorithm:

BTU/hr of the heater/($Y \times$ delta T)

wherein delta T=(Required Kill Temperature−Coldest possible inlet fluid temperature)

and where Y is derived from the following formula:

(Specific heat of the fluid to be heated×Weight of the fluid to be heated×minutes in one hour);

c) controlling the removal of treated water from said enclosure; and d) removing pathogens from pathogen laden water vapor inside said enclosure.

17. The method as recited in claim 16 wherein the step of removing pathogens from water vapor includes the step of engaging the pathogen laden water vapor to a toxic media bed.

18. The method as recited in claim 16 wherein the step of removing pathogens from water vapor includes the step of providing a containment spray curtain.

* * * * *